US005938207A

United States Patent [19]

Marchionna et al.

[11] Patent Number: 5,938,207

[45] Date of Patent: Aug. 17, 1999

[54] HEAT ENGINE ROD SEAL SYSTEM

[75] Inventors: Nicholas R. Marchionna, Ann Arbor; Matthew J. Brusstar, Farmington Hills, both of Mich.

[73] Assignee: STM Corporation, Ann Arbor, Mich.

[21] Appl. No.: 08/893,965

[22] Filed: Jul. 16, 1997

[51] Int. Cl.[6] .......... F16J 15/18

[52] U.S. Cl. .......... 277/513; 277/902; 92/86

[58] Field of Search .......... 277/902, 408, 277/512, 513, 514, 550, 563; 92/86; 60/517

[56] References Cited

U.S. PATENT DOCUMENTS

| | | | |
|---|---|---|---|
| 3,810,634 | 5/1974 | Hakansson | 92/86 X |
| 3,865,015 | 2/1975 | Hakansson | 92/86 X |
| 4,080,788 | 3/1978 | Kantz | 60/517 |
| 4,093,239 | 6/1978 | Sugahara | 277/514 |
| 4,381,648 | 5/1983 | Balas, Jr. | 60/517 |
| 4,452,042 | 6/1984 | Lindskoug | 60/517 |
| 4,523,635 | 6/1985 | Nishizaki et al. | 165/104.12 |
| 4,564,202 | 1/1986 | Momose | 277/550 X |
| 4,623,151 | 11/1986 | Kashiwamura et al. | 277/902 |
| 4,736,586 | 4/1988 | Kawajiri et al. | 277/451 X |
| 5,052,694 | 10/1991 | Lipschitz | 277/408 |
| 5,056,419 | 10/1991 | Watanabe et al. | 277/550 X |
| 5,085,054 | 2/1992 | Katsuda et al. | 60/517 |

FOREIGN PATENT DOCUMENTS

| | | | |
|---|---|---|---|
| 55-104549 | 8/1980 | Japan | 60/517 |

*Primary Examiner*—Lynne A. Reichard
*Assistant Examiner*—Greg Binda
*Attorney, Agent, or Firm*—Harness, Dickey & Pierce P.L.C.

[57] ABSTRACT

A rod seal system having a pair of rod seals that form a buffer area between a high pressure area containing working gas and a low pressure area of a heat engine, such as a Stirling cycle engine. A pump that becomes passively charged with working gas at relatively low pressure and which releases working gas at relatively high pressure when actuated is used to force working gas from the buffer area to the high pressure area through a conduit. The working gas may be hydrogen gas and the pump may be a metal hydride pump that is thermally actuated. The low pressure area may contain air and lubricant at atmospheric pressure. A system for separating the lubricant collecting within the buffer area and reintroducing the lubricant into the low pressure area can also be incorporated into the rod seal system.

19 Claims, 1 Drawing Sheet

HEAT ENGINE ROD SEAL SYSTEM

BACKGROUND AND SUMMARY OF THE INVENTION

This invention is related to a rod seal system and particularly to an improved rod seal system for heat engine applications, such as Stirling cycle engine applications. The improved rod seal system isolates a high pressure area from a low pressure area through the use of a pair of rod seals that define a buffer area. The rod seal system utilizes a working gas conduit connecting the buffer area and the high pressure area and a pump that is charged with working gas at relatively low pressure and releases working gas at relatively high pressure when actuated, thereby forcing working gas received from the buffer area back into the high pressure area through the working gas conduit.

Rod seals are used in various machine applications and are typically used to prevent fluids from moving from one area of a machine to another area of the machine when a rod extends between these areas. A number of rod seal designs are known for use under a variety of different types of operating conditions.

While simple and effective rod seal designs are known for use in rigid or static applications, designing a rod seal that provides adequate sealing becomes significantly more complicated if an effective seal must be maintained as the rod moves with respect to the rest of the machine, such as by rotating (the motion of a typical drive shaft) or by reciprocating (the motion of a typical piston rod). Further design complications are introduced if the rod seal is expected to provide a long service free life and the seal must prevent the migration of fluids under a variety of operating conditions, such as during machine warm up and cool down. Additional design complications arise if the areas separated by the rod seal have a significant difference in pressure. This pressure differential creates significant stresses on the rod seal that must be compensated for to provide proper sealing. This pressure differential is particularly difficult to compensate for if the rod seal is expected to prevent losses of a highly permeable gas such as hydrogen. At the high working gas temperatures and pressures used within heat engines, hydrogen gas will permeate through a wide variety of engineering materials, including metal alloys.

The inventive rod seal system has been particularly designed to operate in an environment in which a high pressure area and a low pressure area in a heat engine are spanned by a reciprocating rod, such as by a piston rod. The high pressure area is typically a section within the cylinder walls of the heat engine. Working gas, such as hydrogen, undergoes a cyclical variation in pressure within the cylinder walls which produces a reciprocating motion in a piston positioned within the cylinder walls.

The low pressure area is typically an area within the drivecase of the heat engine. In this area, the reciprocating motion of the piston rod can be converted to rotational motion of a drive shaft, such as by a swashplate mechanism assembly. To reduce the number of areas of the heat engine that may be considered a "pressure vessel" by certifying organizations and others evaluating the heat engine from a safety perspective, the high pressure working fluid in the heat engine is preferably confined to the maximum extent possible to the opposing ends of the cylinder walls and the associated heat transfer devices and passageways. The pressure within the drivecase and the remaining areas of the heat engine can then be maintained at a low pressure, preferably at approximately atmospheric pressure. While isolating these areas substantially reduces the required burst strength of the drivecase and other associated components, it substantially increases the pressure differential between the working gas within the cylinder walls and the gas (typically air) within the drivecase. This increased pressure differential substantially increases the difficulty of effectively sealing the high pressure area within the cylinder walls from the low pressure area within the drivecase.

The inventive rod seal system effectively isolates the high pressure working gas filled area from the low pressure area by utilizing a pair of rod seals which form a buffer area between the high pressure area and the low pressure area. A pump positioned with a working gas conduit is used to force working gas that leaks past one rod seal to the buffer area back into the high pressure area. The pump removes working gas from the buffer area by absorbing the working gas at relatively low pressure. When the pump is actuated, it releases the working gas and reintroduces the working gas into the high pressure area. The pump is connected to a controller which actuates the pump when a sensor in fluid communication with the buffer area determines that the pressure in the buffer area has exceeded a certain level. Check valves are located in the working gas conduit on opposing sides of the pump to assure that the flow of working gas through the working gas conduit only occurs in a single direction, i.e. from the buffer area to the high pressure area. A working gas storage container can also be installed within the working gas conduit to increase the quantity of working gas that can be stored within the working gas conduit and increase the effective size of the buffer area.

The low pressure area of the heat engine will typically contain a lubricant, such as oil, as well as air. The outer peripheral surface of the piston rod may, for instance, be coated with a thin film of the lubricant and this lubricant may tend to accumulate within the buffer area as the piston rod reciprocates with respect to the rod seals. In these cases, some type of lubricant/working gas separator, such as an oil separating membrane, can be positioned within the working gas conduit and used to prevent the lubricant from traveling through the working gas conduit toward the high pressure area. A lubricant conduit can be used to return the lubricant isolated by the lubricant/working gas separator to the low pressure area. The lubricant conduit can include a lubricant trap which stores lubricant before it is returned to the low pressure area and a lubricant return valve which allows the lubricant to enter the low pressure area from the lubricant conduit.

The heat engine environment of the current rod seal system can comprise a Stirling cycle engine similar to those previously developed by the assignee of the present invention, Stirling Thermal Motors, Inc., including those described in U.S. Pat. Nos. 4,481,771; 4,532,855; 4,615,261; 4,579,046; 4,669,736; 4,836,094; 4,885,980; 4,707,990; 4,439,169; 4,994,004; 4,977,742; 4,074,114; 4,966,841; and 5,611,021; which are hereby incorporated by reference. Basic features of many of the Stirling cycle engines described in the above referenced patents may be implemented in connection with a heat engine incorporating the present invention.

The inventive rod seal system allows for a more effective seal to be formed between the high pressure area and the low pressure area than is possible with a conventional system having a single sliding contact rod seal and results in reduced frictional power losses and extended rod seal service lives compared to conventional systems.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
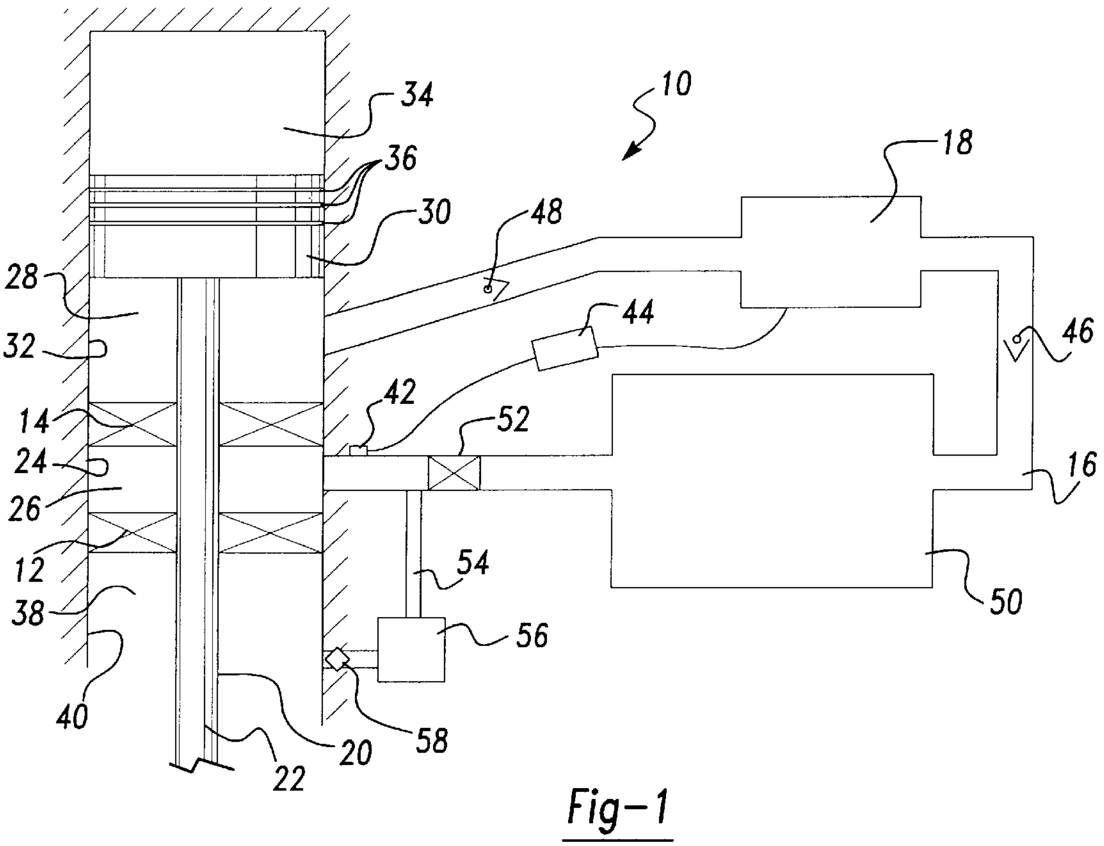
FIG. 1 is a cross-sectional view through a heat engine rod seal system in accordance with this invention.

A heat engine rod seal system in accordance with this invention is shown in an installed condition in FIG. 1 and is generally designated by reference number 10. Rod seal system 10 includes a number of primary components including first seal 12, second seal 14, working gas conduit 16 and pump 18.

First seal 12 and second seal 14 are rod seals that simultaneously engage the outer peripheral surface 20 of a piston rod 22. First seal 12 and second seal 14 allow pressure differentials to be established and maintained in the area below the first seal 12, in the area between the first seal 12 and the second seal 14, and in the area above the second seal 14. Sliding contact rod seals may be used for first seal 12 and second seal 14, such as sliding contact rod seals that have spring biased actuating collars which produce a radially inward squeezing force against the piston rod during use. These collars may be made from an elastomeric material such as a graphite filled Teflon™ substance. Rod seals of this type are shown in more detail in U.S. Pat. No. 5,611,021, which is assigned to the assignee of the present invention, Stirling Thermal Motors, Inc.

First seal 12 and second seal 14 are typically mounted within a housing 24 that is fixed with respect to other major components of the heat engine. A buffer housing is formed by first seal 12, second seal 14 and housing 24 and the area within the buffer housing is referred to as the buffer area 26. The area on the opposite side of second seal 14 (opposite buffer area 26) is high pressure area 28. High pressure area 28 is bounded on one side by second seal 14 and on another side by a piston 30 which is connected to and reciprocates with piston rod 22. High pressure area 28 is also bounded by cylinder walls 32 which are fixed to housing 24. Housing 24 and cylinder walls 32 may have different circumferential dimensions and may comprise separate components, with the cross-sectional dimension of the housing 24 often being smaller than the cross-sectional dimension of the cylinder walls 32. A head space area 34 is also present within cylinder walls 32 above piston 30.

Piston 30 and the attached piston rod 22 reciprocate as the heat engine runs. This reciprocation is caused by a difference in working gas pressure between the high pressure area 28 and the head space area 34 within the cylinder walls 32. Circumferential piston rings 36 inhibit working gas from leaking between the piston 30 and the cylinder walls 32 in response to this working gas pressure differential. In double acting heat engines, the piston 30 will be moved toward the second seal 14 or away from the second seal 14 in response to a positive or negative pressure differential between the pressure of the working gas in the head space area 34 and the pressure of the working gas in the high pressure area 28, respectively.

The area on the opposite side of the first seal 12 (opposite the buffer area 26) is the low pressure area 38. Low pressure area 38 is contained within a drivecase 40 which is fixed with respect to the housing 24. Drivecase 40 and housing 24 may have different circumferential dimensions and may comprise separate components, with the cross-sectional dimension of the housing 24 often being smaller than the cross-sectional dimension of the drivecase 40. Low pressure area 38 is typically maintained at or near atmospheric pressure and typically contains air and lubricants, such as oil, that are used to lubricate the components of the heat engine located within the drivecase 40.

In a double acting Stirling cycle engine, the mean pressure of the working gas in the head space area 34 and the high pressure area 28 may be approximately fifteen megapascals (15 MPa) and the positive and negative pressure excursions from this mean pressure that cause the piston 30 to reciprocate may be approximately four megapascals (4 MPa) above or below this mean pressure. The working gas pressure in the high pressure area 28 would therefore cyclically vary between approximately eleven megapascals (11 MPa) and approximately nineteen megapascals (19 MPa) as the heat engine operates. In this type of environment, the pressure of the working gas within the buffer area 26 could vary between 1 and 2 megapascals (1–2 MPa) and the pressure within the low pressure area 38 could typically be maintained at approximately atmospheric pressure.

The first seal 12 substantially controls the leakage of working gas from the buffer area 26 to the low pressure area 38 and inhibits the introduction of lubricants into buffer area 26 from low pressure area 38. The second seal 14 substantially controls the leakage of working gas from the high pressure area 28 into the buffer area 26. Although the first seal 12 and the second seal 14 substantially control the leakage of working gas and lubricants into and out of the buffer area, some leakage of these materials can be anticipated, if only on a molecular level.

As piston rod 22 reciprocates, the pressure of the working gas within buffer area 26 will tend to increase. Although a very small quantity of working gas within the buffer area 26 will leak past the first seal 12 into the low pressure area 38, this leakage will be very limited due to the limited pressure differential between the buffer area 26 and the low pressure area 38. A greater amount of working gas will leak past the second seal 14 and into the buffer area 26 due to the much larger pressure differential between the high pressure area 28 and the buffer area 26. Lubricants that form a thin coating on the peripheral surface 20 of the piston rod 22 may also accumulate within the buffer area 26 as the piston rod 22 reciprocates. This will be particularly true if the first seal 12 comprises the type of sliding contact rod seal discussed previously. The accumulation of working gas and lubricants in the buffer area 26 thereby tends to slowly raise the pressure within this area as the heat engine operates.

When a pressure sensor 42 in fluid communication with the buffer area 26 determines that the pressure within the buffer area has exceeded a certain set pressure or upper pressure limit value, such as two megapascals (2 MPa), a controller 44 actuates the pump 18. The pump 18 then releases working gas (typically through a material disassociation process) at sufficiently high pressure to allow the working gas to enter high pressure area 28. After the pump 18 has been inactivated, the pump 18 begins to withdraw and become charged with lower pressure working gas from the buffer area 26 through the working gas conduit 16. This reduces the pressure of the working gas within the buffer area 26.

To assure that the direction of the working gas flow is restricted and no working gas flows from the high pressure area 28 to the buffer area 26 through the working gas conduit 16, a first check valve 46 and a second check valve 48 are positioned within the working gas conduit 16 on opposite sides of the pump 18. These check valves are designed to allow working gas flow in the proper direction while inhibiting working gas flow in the opposite direction.

Pump 18 operates by becoming passively charged with working gas at relatively low pressure and releasing working gas at relatively high pressure when the pump is actuated. These types of pumps, which can be thought of as solid-state pumps, offer many advantages over conventional compressors that would mechanically compress the working gas. In contrast to conventional mechanical pumps, the solid-state pumps have virtually no moving parts other than applicable valve components. This can substantially increase the service life of the pump assemblies. The solid-state pumps also have a great deal of additional design flexibility compared to conventional compressors because solid-state pumps do not have to be built around moving components.

The pump 18 may, for instance, consist of a thermally actuated metal hydride pump that allows hydrogen working gas to form metal hydrides at relatively low pressures and which releases the hydrogen at relatively high pressures when a heat source is actuated. A metal hydride hydrogen pump of this type is sold under the trade name "SOLID-H" by Hydrogen Components, Inc., 12420 North Dumont Way, Littleton, Colo. 80125. A 200° temperature increase for this type of pump, for instance, may result in an increase by several orders of magnitude of the pressure of the hydrogen gas within the pump. The pump 18 can be returned to the lower temperature initial condition by inactivating the heating system and allowing the pump to passively cool to ambient conditions. If more rapid cooling is required (to decrease the minimum effective pump cycle time), an active cooling system, such as a system that circulates cooling air or water past the pump, could be employed. A storage container 50, such as a metal hydride storage device, can be used to increase the quantity of working fluid that is able to be stored within working gas conduit 16 and to increase the effective size of the buffer area 26.

A lubricanttworking gas separator, such as an oil separating membrane 52, can be place near the entrance of the working gas conduit 16 to separate the lubricant from the working gas and to prevent the lubricant from contaminating the pump 18, the storage container 50, the first check valve 46 or the second check valve 48. A hydrogen gas-engine oil separator of this type is sold under the trade name "VAPE-SORBER" by Osmonics, 5951 Clearwater Drive, Minnetonka, Minn. 55343-8990. The lubricant isolated by oil separating membrane 52 can be returned to low pressure area 38 through a separate lubricant conduit 54. The lubricant conduit 54 can incorporate a lubricant trap 56 which retains the lubricant isolated by the oil separating membrane 52 until a sufficient quantity of lubricant has been isolated. When this occurs, the lubricant return valve 58 can open, thereby allowing the lubricant within lubricant trap 56 to flow into low pressure area 38. This lubricant would typically flow by gravity to a sump area where it would be collected and forced by a lubrication pump to the various parts of the heat engine requiring lubrication, such as piston rod 22. The lubricant return valve 58 is required to prevent working gas from constantly flowing from the buffer area 26 to the low pressure area 38 through the lubricant conduit 54.

Although the embodiment of the inventive rod seal system 10 described above is depicted in a reciprocating rod environment, it will be readily understood that the rod seal system can be used for a variety of other rod sealing applications, such as in connection with a rotating rod. It will also be readily understood that additional rod seals can be employed in connection with the inventive rod seal system to create additional buffer areas. Pumps can then be used to force the working gas in these additional buffer areas to a higher pressure buffer area or the high pressure area to further increase the performance characteristics of the rod seal system.

It is to be understood that the invention is not limited to the exact construction illustrated and described above, but that various changes and modifications may be made without departing from the spirit and scope of the invention as defined in the following claims.

We claim:

1. A rod seal system for a heat engine, such as a Stirling cycle engine, having a low pressure area, a high pressure area containing a working gas, and a moving rod extending between said low pressure area and said high pressure area, said rod seal system comprising:

a first rod seal, engaging said rod, said first rod seal inhibiting working gas flow into said low pressure area, a second rod seal, engaging said rod between said first rod seal and said high pressure area, said second rod seal inhibiting working gas flow out of said high pressure area, said first rod seal and said second rod seal defining therebetween a buffer area, said buffer area having a higher pressure than said low pressure area and a lower pressure than said high pressure area, a working gas conduit between said buffer area and said high pressure area, a solid state pump, located within said working gas conduit, that is passively charged with working gas received from said buffer area at relatively low pressure and releases working gas at relatively high pressure when actuated, thereby forcing working gas received from said buffer area into said high pressure area through said working gas conduit, and wherein; and a first check valve positioned within said working gas conduit allowing working gas to flow from said buffer area toward said pressure area and inhibiting working gas from flowing from said high pressure area toward said buffer area.

2. A rod seal system according to claim 1 further including a second check valve positioned within said working gas conduit allowing working gas to flow from said buffer area toward said high pressure area and inhibiting working gas from flowing from said high pressure area toward said buffer area, said pump located between said first check valve and said second gas valve within said working gas conduit.

3. A rod seal system according to claim 1 wherein said working gas is predominately hydrogen gas.

4. A rod seal system according to claim 1 wherein said low pressure area primarily contains air.

5. A rod seal system according to claim 1 further including working gas storage means for storing additional quantities of working gas within said working gas conduit.

6. A rod seal system according to claim 5 wherein said working gas storage means comprises a metal hydride storage device.

7. A rod seal system according to claim 1 wherein said pump is thermally actuated.

8. A rod seal system according to claim 1 wherein said pump is a metal hydride pump.

9. A rod seal system according to claim 1 wherein said low pressure area has a pressure of approximately atmospheric pressure.

10. A rod seal system for a heat engine, such as a Stirling cycle engine, having a low pressure area, a high pressure area containing a working gas, and a moving rod extending between said low pressure area and said high pressure area, said rod seal system comprising:

a first rod seal, engaging said rod, said first rod seal inhibiting working gas flow into said low pressure area, a second rod seal, engaging said rod between said first rod seal and said high pressure area, said second rod seal inhibiting working gas flow out of said high pressure area, said first rod seal and said second rod seal defining therebetween a buffer area, said buffer area having a higher pressure than said low pressure area and a lower pressure than said high pressure area, a working gas conduit between said buffer area and said high pressure area, a solid state pump, located within said working gas conduit, that is passively charged with working gas received from said buffer area at relatively low pressure and releases working gas at relatively high pressure when actuated, thereby forcing working gas received from said buffer area into said high pressure area through said working gas conduit, and wherein; and wherein said low pressure area contains a lubricant, said lubricant is present on said rod, and said rod seal system further includes lubricant separation means, positioned within said working gas conduit, for inhibiting the passage of lubricant from said buffer area to said high pressure area through said working gas conduit and for isolating said lubricant.

11. A rod seal system according to claim 10 wherein said lubricant separation means comprises an oil separating membrane.

12. A rod seal system according to claim 10 further including a lubricant conduit for returning said lubricant isolated by said lubricant separation means to said low pressure area.

13. A rod seal system according to claim 12 further including a lubricant trap within said lubricant conduit.

14. A rod seal system according to claim 12 further including a lubricant return valve, located within said lubricant conduit, allowing said lubricant to flow from said working gas conduit toward said low pressure area in said lubricant conduit and inhibiting said lubricant from flowing from said low pressure area toward said working gas conduit through said lubricant conduit.

15. A rod seal system according to claim 14 wherein said lubricant return valve allows lubricant to enter said low pressure area when a certain amount of said lubricant has collected within said lubricant conduit.

16. A rod seal system for a heat engine, such as a Stirling cycle engine, having a low pressure area, a high pressure area containing hydrogen gas, and a reciprocating rod extending between said low pressure area and said high pressure area, said rod seal system comprising:

a first rod seal, engaging said rod, said first rod seal inhibiting hydrogen gas flow into said low pressure area, a second rod seal, engaging said rod between said first rod seal and said high pressure area, said second rod seal inhibiting hydrogen gas flow out of said high pressure area, said first rod seal and said second rod seal defining therebetween a buffer area, said buffer area having a higher pressure than said low pressure area and a lower pressure than said high pressure area, a conduit between said buffer area and said high pressure area, and a metal hydride pump, located within said conduit, that receives hydrogen gas from said buffer means and releases hydrogen gas to said high pressure area when actuated; and a first check valve positioned within said conduit allowing working gas to flow from said buffer area toward said high pressure area and inhibiting working gas from flowing from said high pressure area toward said buffer area.

17. A rod seal system according to claim 16 wherein said first rod seal and said second rod seal are sliding contact rod seals.

18. A rod seal system for a heat engine, such as a Stirling cycle engine, having a low pressure area, a high pressure area containing a working gas, and a reciprocating rod extending between said low pressure area and said high pressure area, said rod seal system comprising:

first sealing means for inhibiting working gas flow into said low pressure area, second sealing means for inhibiting working gas flow out of said high pressure area, a buffer chamber between said first sealing means and said second sealing means, said buffer chamber having a higher internal pressure than said low pressure area and a lower internal pressure than said high pressure area, a conduit between said buffer chamber and said high pressure area, and pumping means for passively concentrating working gas received at relatively low pressure from said buffer chamber and for releasing working gas at relatively high pressure when said pumping means are actuated, thereby forcing working gas received from said buffer chamber into said high pressure area through said conduit; and a first check valve positioned within said conduit allowing working gas to flow from said buffer chamber toward said high pressure area and inhibiting working gas from flowing from said high pressure area toward said buffer chamber.

19. A rod seal system according to claim 18 wherein said pumping means are actuated when said internal pressure within said buffer chamber exceeds a certain upper pressure limit value.

* * * * *